(No Model.)
A. M. G. SEBILLOT.
BLAST FURNACE FOR ZINC ORE.
No. 291,410. Patented Jan. 1, 1884.
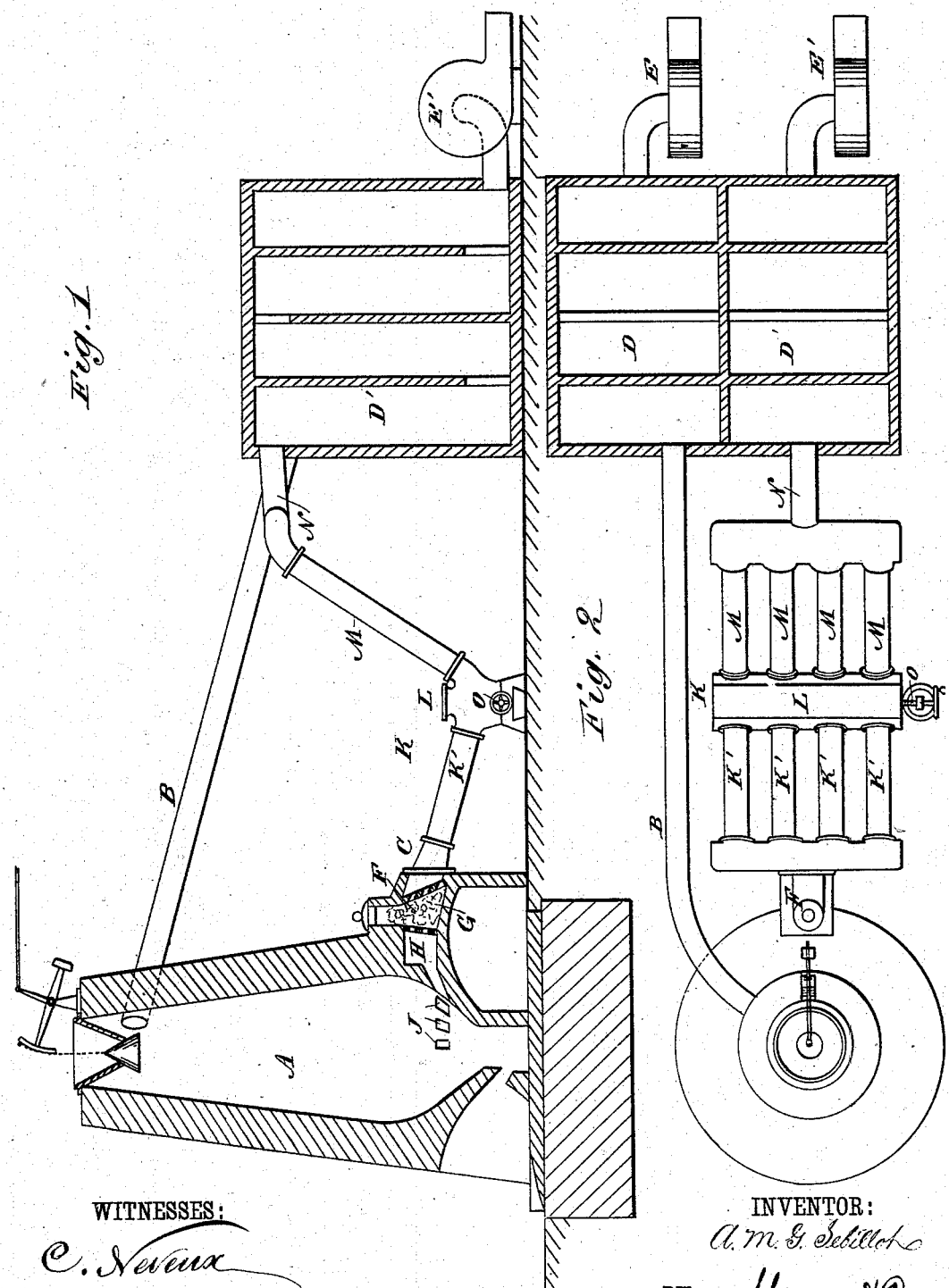
WITNESSES:
C. Neveux
C. Sedgwick
INVENTOR:
A. M. G. Sebillot
BY Munn & Co.
ATTORNEYS.

United States Patent Office.

AMÉDÉE M. G. SÉBILLOT, OF PARIS, FRANCE.

BLAST-FURNACE FOR ZINC ORES.

SPECIFICATION forming part of Letters Patent No. 291,410, dated January 1, 1884.

Application filed May 26, 1883. (No model.)

*To all whom it may concern:*

Be it known that I, AMÉDÉE M. G. SÉBILLOT, of Paris, France, have invented a new and Improved Blast-Furnace for Zinc Ores, of which the following is a full, clear, and exact description.

Numerous attempts have been made to obtain metallic zinc in blast-furnaces from ores containing zinc mixed with iron and other metals; but all these attempts have proved futile, as the vapors of zinc are immediately converted into oxide of the zinc by even the smallest quantity of carbonic acid.

The object of my invention is to provide a new and improved blast-furnace by means of which the carbonic acid is destroyed and the above object can be accomplished.

It consists in separate condenser-chambers for each outlet-pipe, the said chambers having exhaust-fans or analogous devices.

It further consists in a chamber filled with charcoal, through which the vapors passing through the lower outlet-pipe are conducted.

It further consists in a condenser formed of pipes inclined downward toward a metal receiving-chamber and pipes inclined upward from the said chamber.

It also consists in various parts and details and various combinations of the same, as will be fully set forth and described hereinafter.

Reference is to be had to the accompanying drawings, forming part of this specification, in which similar letters of reference indicate corresponding parts in both the figures.

Figure 1 is a longitudinal sectional elevation of my improved blast-furnace for zinc ores. Fig. 2 is a plan view of the same, parts being shown in horizontal section.

A blast-furnace, A, is constructed in the usual manner, and is provided with the usual devices for creating the blast. The top of the furnace is provided with a cone-cover, and the furnace is provided with two outlet-pipes, B and C, for the gases, the pipe B being at the top and the pipe C at the bottom. The pipe B conveys the gases, &c., directly from the furnace into a condensing-chamber, D, divided into a series of compartments, and provided with an exhausting fan, E, or analogous device. The lower outlet-pipe, C, is at the plane of the most intense heat, and is secured to a chamber, F, formed in the side of the furnace, and filled with pieces of charcoal G, through which the gases must pass. The gases pass into the chamber from a cavity, H, formed in the wall of the furnace, and provided with a series of openings or short channels, J, leading into the interior of the furnace. The outer and inner sides of the chamber F are perforated to permit the passage of the gases. The pipe C conducts the fumes and gases to a condenser, K, formed of a series of pipes, K', inclined downward toward and communicating with a transverse iron chamber, L, from which pipes M are inclined upward, and terminate in a transverse pipe connected by a pipe, N, with a condensing-chamber, D', divided into a series of compartments, and provided with an exhausting-fan, E', or analogous device. The gases exhausted from chambers D D' by the fans E E' are conducted to suitable furnaces for the purpose of utilizing them in the usual manner.

The operation is as follows: The charcoal G in the chamber F is kept at a red heat by the gases passing through, and converts the carbonic acid into carbonic oxide, leaving the vapors of zinc clean. These vapors, escaping at a very high temperature, are condensed by the pipes K' and M, and the molten or liquid zinc collects in the chamber L, from which it can be drawn by means of the cock O. The two outlet-pipes B and C are necessary, so that the ordinary reactions of the blast-furnace can take place. The proportion of gas passing through each independent outlet-pipe B and C can be regulated by means of the two independent fans E E'. A sufficient quantity of gas must pass through the layers of ore and fuel to produce the reduction of the metals; but at the same time the quantity of gas escaping from the lower part must be kept as large as possible, to carry off as large a quantity of the vapors of zinc through the lower outlet-pipe, C. The upward current carries off some of the zinc vapors; but they are condensed in the chamber D. The greater part of the zinc will be collected in the cast-iron chamber L, and the zinc condensed in the chambers D D' is collected and placed into the furnace again.

The non-volatile metals—such as iron, lead, &c.—collect in the crucible or pit of the furnace in the usual manner.

Having thus described my invention, I claim as new and desire to secure by Letters Patent—

1. In a blast-furnace for zinc ores, the combination, with the furnace-chamber, of the outlet-pipe leading directly from the latter to a condenser, and a second outlet-pipe communicating with a chamber containing pieces of charcoal, and with a condenser, said charcoal-chamber communicating with the furnace-chamber, substantially as and for the purpose set forth.

2. A blast-furnace for zinc ores, constructed with an upper and lower outlet-pipe, the latter being connected with a series of condensing-pipes, substantially as herein shown and described.

3. A blast-furnace for zinc ores, constructed with two outlet-pipes connected with independent chambers having exhaust-fans or analogous devices, substantially as herein shown and described.

4. A blast-furnace for zinc ores, constructed with an upper and a lower outlet-pipe, the latter being provided with a chamber filled with pieces of charcoal or pieces of other material adapted to be heated to a high temperature, substantially as herein shown and described.

5. A blast-furnace combined with an upper and lower outlet-pipe, of which the former is connected with a condensing-chamber and the latter is connected with a condenser formed of pipes and a metal collecting-chamber, which pipe-condenser is connected with a condensing-chamber, substantially as herein shown and described.

6. The combination, with a blast-furnace having a cavity, H, having openings leading to the interior of the furnace, of the chamber F, containing pieces of charcoal, the outlet-pipe C, and the condenser K, substantially as herein shown and described, and for the purpose set forth.

AMÉDÉE M. G. SÉBILLOT.

Witnesses:
   OSCAR F. GUNZ,
   C. SEDGWICK.